United States Patent [19]

Carossino

[11] 4,455,747
[45] Jun. 26, 1984

[54] HAND TOOL FOR REMOVING MATERIAL FROM A PART, ESPECIALLY DEBURRING OR BREAKING ANGLES

[76] Inventor: André Carossino, 88 route de la Princesse, 78430 Louveciennes, France

[21] Appl. No.: 418,745

[22] Filed: Sep. 16, 1982

[30] Foreign Application Priority Data

Sep. 22, 1981 [FR] France ................ 81 17863

[51] Int. Cl.³ .............................................. B26B 3/00
[52] U.S. Cl. ........................................ 30/171; 30/172
[58] Field of Search .......................... 30/171, 169, 172

[56] References Cited

U.S. PATENT DOCUMENTS

| | | | |
|---|---|---|---|
| 1,292,461 | 1/1919 | Hartmann | 30/171 |
| 1,402,166 | 1/1922 | Johnson | 30/171 |
| 1,561,016 | 11/1925 | Pallady | 30/171 |
| 2,356,165 | 8/1944 | King | 30/171 X |
| 3,552,014 | 1/1971 | Persson | 30/169 |
| 3,555,679 | 1/1971 | Sheridan | 30/172 |
| 3,751,804 | 8/1973 | Pulrang | 30/169 |

*Primary Examiner*—Jimmy C. Peters
*Attorney, Agent, or Firm*—Fidelman, Wolffe and Waldron

[57] ABSTRACT

A hand tool for deburring or chamfering a work piece, of the kind comprising: a mount, a handle solid with the mount, a cutting tool adjustably secured to the mount so as to present a cutting edge substantially perpendicular to the handle and the mount, and a bearing member, characterized in that the bearing member is mounted adjacent the cutting tool and is provided with two side faces defining therebetween an angle of 45° to bear on the respective sides of the edge of the work piece, the bearing member having at least one fulcrum, an imaginary line joining the fulcrum with the cutting edge being inclined relative to the axis of the handle by an angle in the range of 8° to 16°.

11 Claims, 7 Drawing Figures

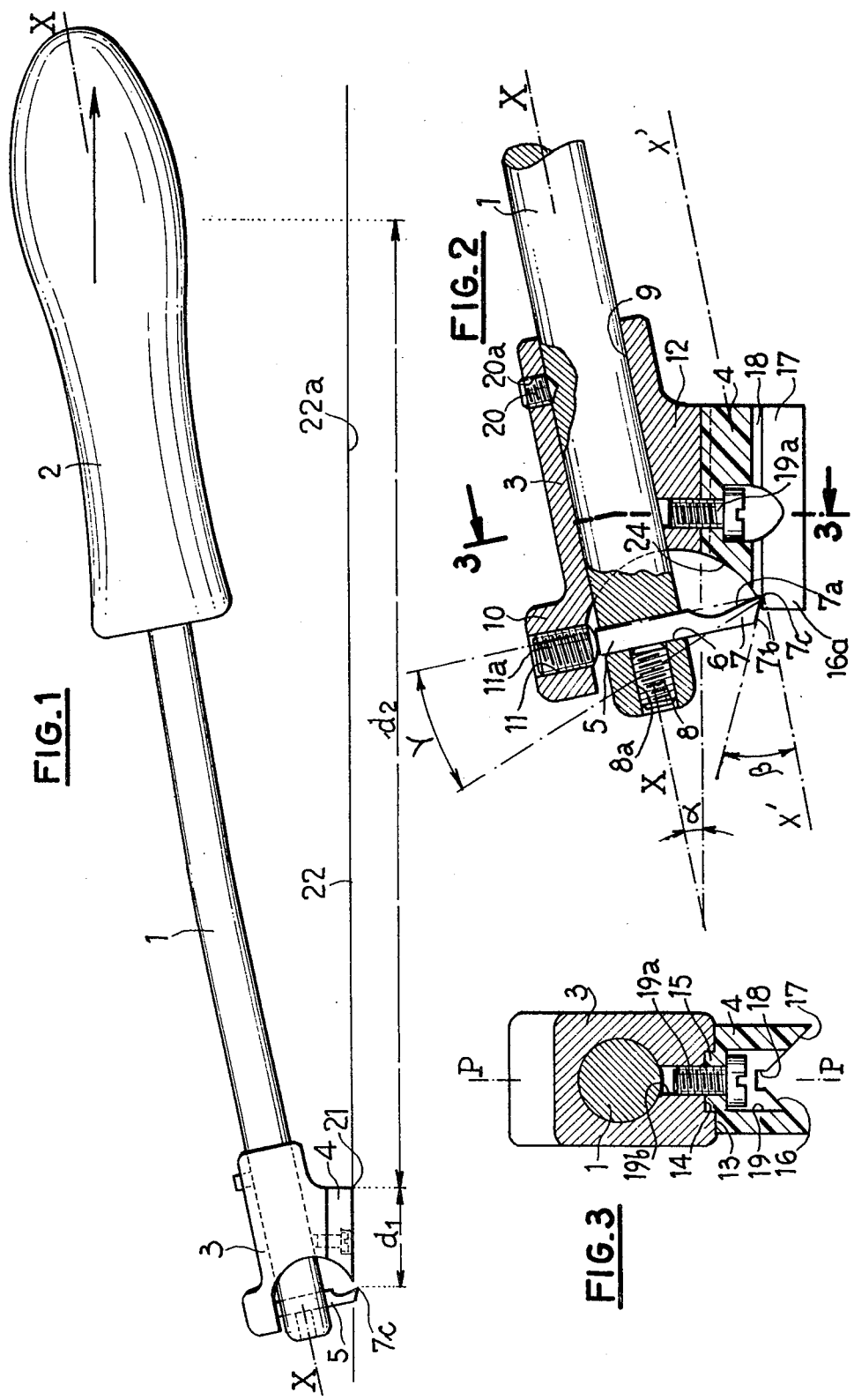

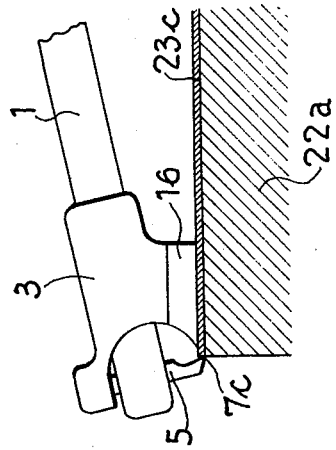
FIG. 4
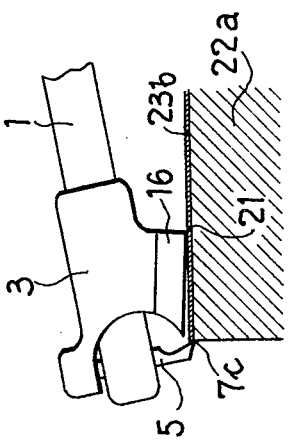
FIG. 5
FIG. 6
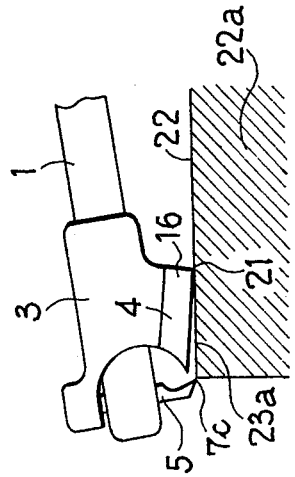
FIG. 7

HAND TOOL FOR REMOVING MATERIAL FROM A PART, ESPECIALLY DEBURRING OR BREAKING ANGLES

The present invention relates to a hand tool for removing material from a part, of the kind comprising a tool mount solid with a handle and bearing at its other end the tool itself which presents a cutting edge.

Tools of this kind are known for deburring or breaking angles (chamfering) plastic or metal parts, and known under the names of scrapers or deburrers, in which the cutting tool itself is in the shape of a cranked lever (in a dog-leg) of which one end is fitted axially into the mount, and is free to rotate, while the cutting edge is formed along the intermediate segment and the end segment, in a plane parallel to or passing through the mount and handle axis. In the case of breaking an edge, the tool can be used equally for a straight edge or a concave edge (for example the intersection of a cylindrical bore or a polygonal passage with the face of a part). To this end, the handle of the tool is positioned transversely relative to the edge and the cutting lever is placed on the edge, the cutting lever engaging the edge and, due to its freedom of rotary movement, engaging the edge to be cut with a depth of cut which balances itself as soon as the whole tool is moved along the edge to produce at will a fine shaving.

Such a tool has two serious disadvantages, however. Firstly, for straight edges, it is impossible to begin removing material from the start of the edge, as the tool cannot bear satisfactorily on the work piece and position itself to penetrate the material. Moreover, on curved convex edges, it is impossible to begin removing material satisfactorily as the cutting tool, which has freedom of movement in two directions, digs in immediately and runs off the edge.

An object of the present invention is to provide a hand tool of the above general kind which can be used right from the start of straight line edges and can also be used on convex curved edges.

The present invention provides a hand tool for deburring or chamfering a work piece, comprising a mount, a handle solid with said mount, a cutting tool secured to said mount so as to present a cutting edge substantially perpendicular to said handle and said mount, said mount presenting bearing surfaces adjacent said cutting edge for engaging said work piece to guide said cutting tool, said bearing surfaces presenting at least one leading edge, an imaginary line joining said leading edge with said cutting edge being inclined relative to the axis X—X of the handle and mount by an angle $\alpha$, where $\alpha$ is between 8° and 16°.

This arrangement not only avoids substantially the disadvantages referred to above, but also the proximity of the bearing surfaces to the cutting edge limits the digging in of the cutting edge and avoids snagging, while giving a regular cut depth, and also the angle of the handle gives a better efficiency for the operator's pull or push on the tool.

In a preferred embodiment of the invention, the draft angle of the cutting tool is between 20° and 30° (preferably 25°) and its back-off angle is between 15° and 25° (preferably 20°); this gives the cutting edge an increased aggressivity towards the material, that is to say a sharper cut, which reduces the corresponding cutting effort to be applied.

The angle $\alpha$ is preferably substantially equal to 12°.

Advantageously the ratio of the distance $d_2$ between said leading edge and the free end of the handle and the distance $d_1$ between said cutting edge and said leading edge is between 10 and 20 (preferably between 12 and 15).

It is a significant feature of the invention that said leading edge of the mount is disposed in an elongate bearing surface, with the cutting edge of the tool projecting relative to said bearing surface.

Other features and advantages of the invention will appear from the following description given by way of example with reference to the accompanying drawings, in which:

FIG. 1 is a side view of a tool according to a first embodiment of the invention, the tool being positioned on an edge of a part, the view being transverse to the part.

FIG. 2 is a view to a larger scale of the mount and the cutting tool of FIG. 4,

FIG. 3 is a sectional view on the line 3—3 of FIG. 2,

FIGS. 4, 5 and 6 illustrate a method of using the tool in several strokes,

FIG. 7 is a view similar to FIG. 2 of another embodiment of the invention.

In FIGS. 1 and 4 to 6, a guide part of a bearing member in the tool has been omitted for clarity.

As shown in FIG. 1, the tool comprises an elongate cylindrical metal shaft 1, which is inserted at one end, for almost half its length into a handle 2 shaped to give a satisfactory grip.

At its other end, the shaft fits into a bore 9 formed in a guide block 3 in plastics material on which are fixed on one hand a bearing member 4 forming a guide and on another hand a cutting blade 5.

As shown in more detail in FIGS. 2 and 3, the blade 5 comprises a cylindrical finger of special steel passing through a bore 6 formed at the end of the shaft 1 diametrically to the shaft, and presenting, outside the bore, a cutting head 7 having a front face 7a and a draft face 7b which meet in a cutting edge 7c. The cutting edge 7c extends perpendicular to the axis X—X of the shaft 1 and the front face 7a is turned towards the handle 2. A locking or grub screw 8 engages in a blind threaded hole 8a in the end of the shaft 1 and axially thereof, so as to engage the cutting finger 5 and lock it in position.

In other embodiments of the invention, the cutting edge 7c is not straight, but is concave, and curved or angular. Such a cutting edge is particularly suitable to deburring and chamfering both sides of a sheet of steel simultaneously.

Adjustment of the block 3 on the shaft I is effected through bore 9 in the block. The block is positioned on the shaft between the handle 2 and the blade 5, adjacent the blade, and presents two projecting parts 10 and 12. The projection 10 extends at the end of the shaft above the blade 5 away from the cutting head 7, so as to present a threaded hole 11 coaxial with the bore 6 in which is engaged an adjustment screw 11a engaging the end of the blade 5, so that the distance by which the blade projects from the shaft 1 and the mount 3 can be regulated. The other projecting part 12 of the mount 3 extends on the same side as the cutting head 7 and presents a fixing face 13 which makes an angle $\alpha$, of the order of 12°, with the axis X—X.

The angle $\alpha$ corresponds to the angle of inclination of the imaginary line joining the cutting edge 7c and the rear bering point 21 as defined below, relative to the general direction of the support. In accordance with the invention, this angle may be chosen to be between 8° and 16°, 12° being optimal for the preferred usage.

A groove 14 is formed in the fixing face 13, and accomodates a rib 15 presented by the guide and bearing member 4. The member 4 is a separate and removable part of parallelepiped shape, and its face opposite the rib 15 presents an inset cavity 16 of prismatic shape, each of whose two side faces 17 makes an angle of 45° relative to the plane P—P of symmetry of the apparatus, this plane passing through the axis X—X and the axis of the blade 5. At the base of the prismatic cavity 16 a slot 18 is formed. Lastly, a blind hole 19 is formed in the part perpendicular to the slot 18 and halfway along the part, so as to accomodate the head of a screw 19a which passes through the rib 15 and screws into a thread 19b formed in the projection 12 on the block 3. The bore 19 is larger than the slot 18 and its depth is sufficient for the head of the screw 19a to be countersunk relative to the slot 18. A locking or grub screw 20 is also provided, and engages in a thread 20a formed in the back of the block 3 radially relative to the shaft 1, so that the screw 20 locks the block on the shaft.

As shown in more detail in FIG. 2, the head 7 of the blade 5 presents, relative to a direction X'—X' parallel to the axis X—X of the mount, a draft angle $\beta$ between 20° and 30°, the preferred value being 25°, and back-off angle $\gamma$ between 15° and 25°, the preferred value being 20°.

Moreover, in accordance with the invention, as shown in FIG. 1, if $d_1$ is the distance between the cutting edge 7c and the rear bearing point 21, and $d_2$ is the distance between this bearing point 21 and the projection of the rear part of the handle 2, the ratio $d_2$ to $d_1$ may be between 10 and 20, and is preferably between 12 and 15.

The bearing point 21 is defined by the transverse line joining the end points (at the end opposite the cutting edge 7c) of the internal corners of the prismatic cavity 16.

In accordance with the invention, it is important that the prismatic guide cavity 16 extends slightly beyond the cutting edge 7c, with a small offset 16a.

The tool described above is suitable for removing metal from an edge 22 of a part 22a which can be equal to or greater than a break of the angle, within the limit of the power which the hand operation of the tool can develop. Thus, for example, in a steel part, a chamfer with a width of 1mm can be produced. As shown in FIGS. 4 and 6 this operation can be performed in several passes. Each of these passes is performed by positioning the tool by its guide and bearing part 4 so that the imaginary rear line 24, forming a theoretical bearing point 21, rests on the surface of the part 22a presenting the line 22 from which material is to be removed, while the blade 5 is positioned right at the start of the line 22, so that the cutting edge 7c projects slightly into the thickness of the part 22a in order to bite into it when the movement starts. When material is to be removed to form a chamfer, the chamfer may be produced on an edge defined by two meeting faces of the part 22a, in which case it is the side planes 17 of the cavity 16 engage the respective faces.

The inclination $\alpha$ of the handle of the tool relative to the work surface reduces correspondingly the effective backoff angle. The cutting angle is accordingly abnormally high initially for this kind of material cut, and it produces a tendency to dig into the material, which would result in the tool jamming. The dig-in tendency of the tool is controlled by the large lever ratio which enables the operator to control the thickness of the cut.

The off-set 16a of the guide surface beyond the cutting edge 7c limits the amount of material removed according to the adjustment of the tool, when the edge cut is started and at the end of the cut.

The magnitude of the draft and back-off angles favour digging in of the tool, but the adjacent bearing line 21, close to the cutting edge 7c, limits the amount that the tool digs in. The magnitude of the angles, combined with the rear bearing 21 and the large lever ratio $d_2$ enable the operator to control the removal of material by pulling the tool by its handle 2 in the direction of the desired chamfer (line 22). To obtain such a chamfer in successive passes, the handle should be progressively raised, as shown in FIGS. 4 to 6, from one stroke to the next so as to obtain a fresh removal of material (thickness 23a in the first pass, FIG. 4, thickness 23b in the second pass, FIG. 5, and final thickness 23c in the third pass, FIG 6). Once the third pass has been performed, the tool is placed so that the flancs 17 of the cavity 16 bear over their whole length on the side faces of the part, so that the three planes formed by the cutting edge 7c, and the two faces of the guide block coincide with the chamfer previously made, so that the guide part 4 bears fully on the work-piece 22a. It follows that, when in this bearing position, the tool is no longer working and no more material is removed.

The depth of the cuts producing the chamfer can be reduced by means of the screw 11a. Also, if only a de-burring is required, the tool is first set up to control the projection of the tool from the contact surfaces by means of the same screw 11a.

It will be seen also that, due to the large lever ratio behind the bearing point 21, as the successive passes are performed, the ratio $d_2$ to $d_1$ changes favourably, given that as the chamfer increases, the bearing zone of the part 4 progressively approaches the cutting edge 7c, that is to say the digging in effect increases and the reaction becomes easier to control.

The alternative embodiment of FIG. 7 differs from FIGS. 1 to 6, in that unlike the tool described above which is designed to be pulled, this second embodiment is designed to be pushed. To this end, and as shown in FIG. 7, the block 3 and guide piece 4 are of similar design, but are fixed by a screw 19a at the end of the shaft 1, whereas the blade 5 is disposed on the handle side of the block 3. The cutting edge 7c is positioned similarly projecting from the slot 18 but, unlike the previous design, the draft angle 7b is disposed on the handle side and the cutting face on the opposite side, that is to say facing the part at the start of a cut (as before). An adjustment screw 11a for the projection of the cutting head 7, and a locking screw 8 for the blade are again provided. The tool operates in the same way essentially as the previous embodiment, except only that the tool is pushed using the handle 2, and not pulled.

In each of the embodiments, the block 3 and the part 4 present a transverse cylindrical cavity 24, forming a back-off chamber in which swarf from the cutting edge can roll, and exit from the tool at one side or another.

It is clear that besides chamfers, it would be possible to modify the shape of the cavity 16 and of the tool cutting edge to offer other material removal operations, such as forming a slot, deburring key slots, shaving off a casting lip, hollow filing, and so on. It should be mentioned that, in the first embodiment, which may be used to obtain a chamfer, the micrometer screw 11a can be adjusted so as to break angles merely.

I claim:

1. A hand tool useable for deburring and chamfering a workpiece, said hand tool comprising:
   a handle having a free end;
   a cutting tool having a cutting edge at an intersection of a draft face and a front face;
   means for removeably securing said cutting tool to said handle such that said cutting edge is substantially perpendicular to a longitudinal axis of said handle;
   bearing means for guiding said cutting tool along said workpiece and for providing a fulcrum, between said handle free end and said cutting edge, about which said hand tool is pivotal to vary engagement of said cutting tool with said workpiece during use of said hand tool, said bearing means straddling a portion of said workpiece and comprising two faces, each face defining a face plane, and a slot aong a line defined by insection of said face planes; and
   mount means for removeable mounting of said bearing means on said handle and for adjustable setting of said cutting tool relative to said bearing means faces,
   whereby said slot accommodates an edge of a workpiece sheet and said faces accommodate intersecting surfaces of a workpiece corner such that different workpiece contours are workable by the same tool.

2. A hand tool as in claim 1, wherein:
   said faces define an angle therebetween of about 90°; and
   an intersection of said longitudinal axis with an imaginary line joining said fulcrum and said cutting edge defines an angle $\alpha$ in the range of about 80° to about 16°.

3. A hand tool as claimed in claim 2, wherein said draft face defines a plane such that intersection of said plane and said longitudinal axis defines a draft angle $\beta$ of said cutting tool, where $\beta$ is between 20° and 30°.

4. A hand tool as claimed in claim 3 wherein said draft angle $\beta$ is substantially equal to 25°.

5. A hand tool as claimed in claim 2, wherein said cutting surface defines another plane such that intersection of said other plane and an axis of said cutting tool defines a back-off angle $\gamma$, where $\gamma$ is between 15° and 25°.

6. A hand tool as claimed in claim 5 wherein said back-off angle $\gamma$ is substantially equal to 20°.

7. A hand tool as claimed in claim 2, wherein a ratio of a distance $d_2$ between said fulcrum and the free end of the handle and a distance $d_1$ between said cutting edge and said fulcrum is between 10 and 20.

8. A hand tool as claimed in claim 7, wherein said ratio of $d_2$ to $d_1$ is between 12 and 15.

9. A hand tool as claimed in claim 1, wherein said bearing means extends past said cutting edge away from said fulcrum to define a trailing portion.

10. A hand tool as claimed in claim 2, wherein said angle $\alpha$ is substantially equal to 12°.

11. A hand tool as claimed in claim 2, wherein said mount means presents a cavity accommodating swarf removal, said cavity facing said cutting tool.

* * * * *

UNITED STATES PATENT AND TRADEMARK OFFICE
CERTIFICATE OF CORRECTION

PATENT NO. : 4,455,747
DATED : June 26, 1984
INVENTOR(S) : Andre Carossino

It is certified that error appears in the above-identified patent and that said Letters Patent are hereby corrected as shown below:

In claim 2 (column 6, line 5 of the printed patent), "80°" should read --8°--.

Signed and Sealed this

Twenty-third Day of April 1985

[SEAL]

Attest:

DONALD J. QUIGG

*Attesting Officer*     *Acting Commissioner of Patents and Trademarks*